INVENTOR.
Richard C. Burch
BY
Peter P. Kozak
ATTORNEY

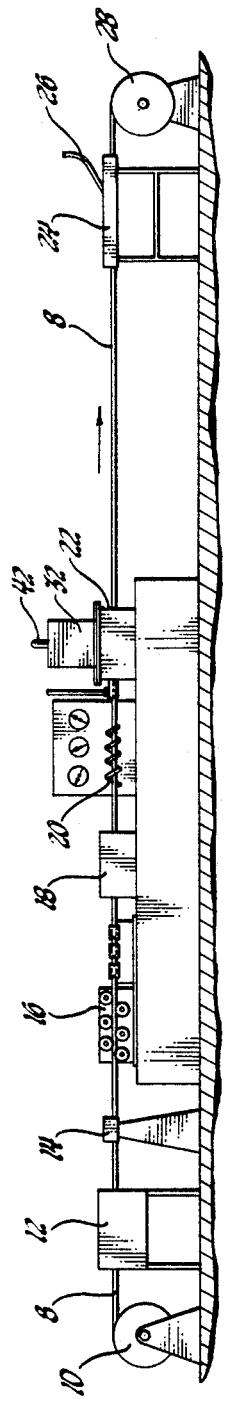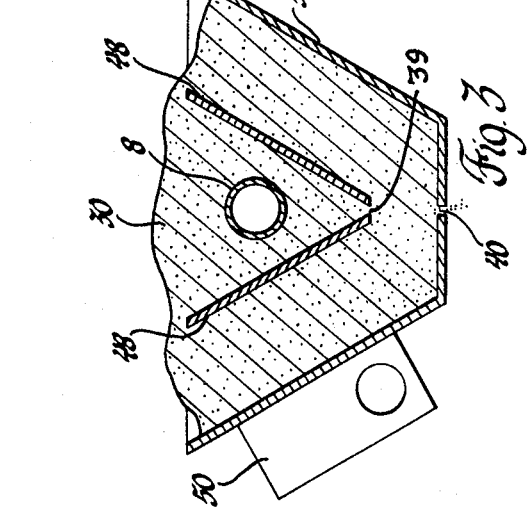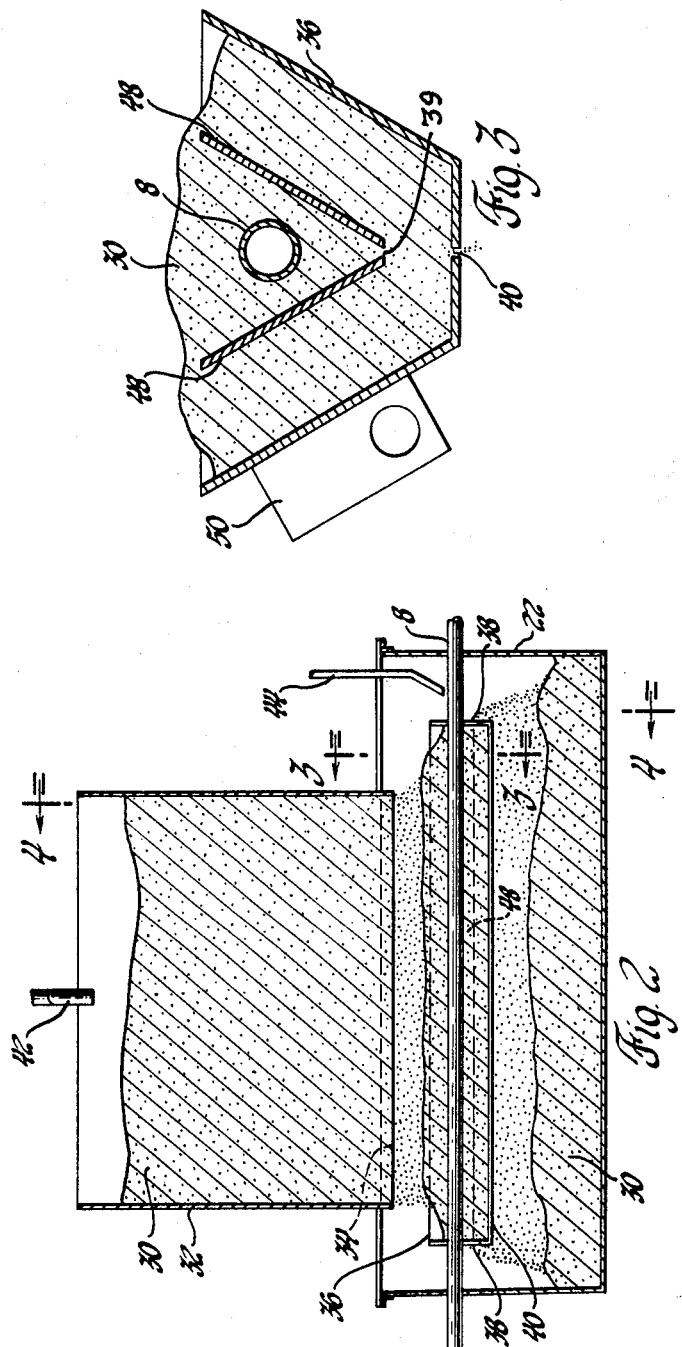

United States Patent Office 3,389,010
Patented June 18, 1968

3,389,010
METHOD FOR COATING ARTICLES
Richard C. Burch, Hilton, N.Y., assignor to General Motors Corporation, Detroit, Mich., a corporation of Delaware
Filed Aug. 27, 1964, Ser. No. 392,414
9 Claims. (Cl. 117—18)

ABSTRACT OF THE DISCLOSURE

A continuous process for the production of uniform synthetic resin and metallic coatings on the elongated articles of indefinite length is disclosed. Tubing is heated to a temperature above the melting point of the thermoplastic coating material and passed through a receptacle having a V-shaped configuration into which a mass of powdery thermoplastic material is continually flowing. The rate the material is poured continuously into the receptacle and the rate at which the material leaves the base of the receptacle are regulated so that the inclined sides of the receptacle support a flowing mass of substantially uniform density of the coating material about the tubing as it passes therethrough. The material adjacent said article in the receptacle is caused to melt and form a molten coating thereon which cools and solidifies after the article leaves the mass to form an adherent coating of substantially uniform thickness.

---

This invention relates to coated elongated articles and more particularly to a process for coating elongated articles with thermoplastic material.

It is frequently desirable or necessary to coat articles such as metal wire and tubing with a protective coating when the articles are exposed to water, destructive solvents, chemicals, or corrosive agents as well as when they must resist mechanical abrasives and frictional wear, or be electrically insulated. The composition of the articles, such as tubing, to be coated may be a metal such as steel, copper, aluminum, and so forth. The coating material may be of any suitable thermoplastic polymer such as polyamides, polyethylene, polyurethane, polymethacrylate, and so forth as well as metals such as copper, zinc, chromium and so forth. Numerous methods are available for the application of such a protective coating. Some of these methods function satisfactorily for certain applications; however, many of these methods do not lend themselves to the application of a protective coating on elongated articles of indefinite lengths such as tubing or wire. Other methods which have been found to lend themselves to the application of a coating on an elongated article frequently have disadvantages that outweigh any advantage a protective coating may afford.

A basic object of this invention is to provide a continuous process for the production of uniform synthetic resin or metallic coatings on elongated articles of indefinite length. A further object of this invention is to provide a process for the production of uniform synthetic resin or metallic coatings coextensively with the exterior surface of an article. It is a still further object of this invention to provide a continuous process for the production of uniform synthetic resin coatings without the necessity of using a liquid coating material.

These and other objects are accomplished by a process in which tubing is heated to a temperature above the melting point of the thermoplastic coating material and passed through a receptacle having a V-shaped configuration into which a mass of powdery thermoplastic material is continually flowing. The rate the material is poured continuously into the receptacle and the rate at which the material leaves the base of the receptacle are regulated so that the inclined sides of the receptacle support a flowing mass of substantially uniform density of the coating material about the tubing as it passes therethrough. The material adjacent said article in the receptacle is caused to melt and form a molten coating thereon which cools and solidifies after the article leaves the mass to form an adherent coating of substantially uniform thickness.

In a preferred embodiment of this invention, the tubing is first passed through a trichloroethylene bath where all contaminants are removed. As the tubing leaves the bath it is dried with an air wiper after which the tubing passes through a rotary or two-plane straightener. Thereafter the tubing is passed through a primer tank where the tubing is coated with a material which facilitates the adhesion of the final coating. The tubing is then passed through an induction heating coil before proceeding through the V-shaped receptacle which contains the thermoplastic coating material. The tubing is coated in the V-shaped receptacle as the powder melts and adheres to the heated tubing. The coated tubing is wiped with air as it comes out of the V-shaped receptacle and cooled in a water bath.

Other objects and advantages of this invention will appear from the following detailed description of a preferred embodiment of the invention, reference being made to the accompanying drawings, in which:

FIGURE 1 is a generally schematic view of an apparatus embodying the present invention;

FIGURE 2 is a side cross sectional view of the fusion tank;

FIGURE 3 is an enlarged end cross sectional view of a preferred V-shaped receptacle with attached vibrator;

Figure 4:
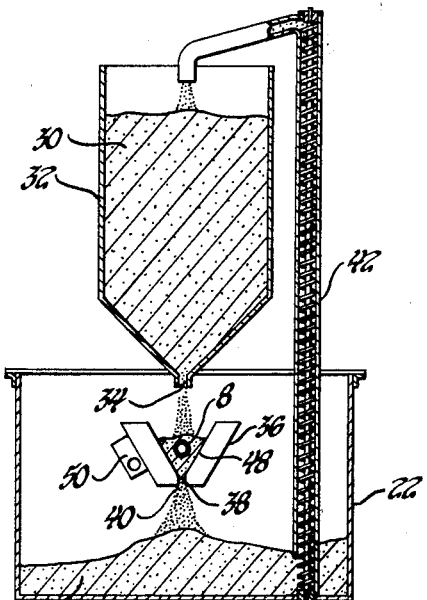
FIGURE 4 is an end cross sectional view of the fusion tank.

Referring now to the drawings, and more particularly to FIGURE 1, steel tubing 8, 3/16 inch O.D., is unrolled from the playout reel 10. The tubing 8 or other linear or elongated stock 8 may be of other compositions than steel, such as copper, steel alloys, brass, tin, nickel, and so forth. Other linear stock such as rectangular bars, triangular bars, and rods may be used in addition to tubing in this process. This process performs equally as well when tubing of a larger diameter is coated.

The tubing 8 is fed into the cleaning tank 12 to remove all contaminants. The cleaning tank 12 is about 6 feet long and contains a suitable solvent, for example, trichloroethylene, which is directed under pressure at the sides of the tubing 8. The solvent dissolves some of the contaminants and removes the other contaminants by forcing them physically from the tubing. As the tubing leaves the cleaning tank 12 it is air dried by means of an air wiper 14 and then straightened by a rotary or two-plane straightener 16. The air wiper 14 and rotary or two-plane straightener 16 are conventional equipment which are well known in the art and will not be described here.

The tubing proceeds into a primer tank 18 where the tubing is coated with a material to improve the adhesion between the thermoplastic material and the tubing. The primer tank 18 is about six feet long and contains a primer which is suitable for the particular thermoplastic coating material being used. The primer in tank 18 is directed under pressure to the sides of the tubing 8. The application of a primer onto the tubing by means of prime tank 18 is necessary when good adhesion between the thermoplastic coating and the tubing is essential. The thickness of the primer coating that is applied is preferably approximately 0.0001 inch. These primers are similar to paint in that they have a large amount of solvent, frequently as much as 85 to 92%, and approximately 8 to 15% of a resin. The resin may be vinyl chloride or phenol formaldehyde or a combination of these two mamaterials, for example. The solvent in the primer could be a mixture of toluene, methylisobutyl ketone, xylene, and so forth.

The tubing 8 is then heated by means of a high frequency induction heating coil 20 to at least the melting temperature of the coating material. This high frequency induction heating coil 20 is standard equipment and is well known in the art. The temperature to which the tubing 8 is heated depends upon the coating material. The preferred temperature range of the tubing as it leaves the induction heating coil for the different thermoplastic coating materials was found to be between 150 and 200° F. for epoxys, 275 and 325° F. for cellulosics, 300 and 350° F. for polyethylenes, and 500 to 600° F. for polyamides.

The heated tubing 8 then enters the fusion tank 22, as will be hereinafter described, where it is coated with a thermoplastic material. A wide variety of thermoplastic coating materials which may be used include organic polymers such as the cellulose esters, polyamides, epoxys, polyethylenes, acrylics, butyrates, vinyls and acetates as well at those polymers described in U.S. Patents No. 2,844,489 and No. 3,102,823. In addition to the organic polymeric materials which may be used in this process, it is possible to use metal powders, such as copper powder, aluminum powder, chromium powder, and so forth. In some instances it may be desirable to use a mixture of an organic polymer powder and a metal powder. When mixtures of an organic polymer and metal powder are used, it is necessary to consider the melting point of each powder that it used in the mixture. Satisfactory coatings have been obtained with a mixture containing 75% polyamide resin and 25% aluminum powder. It is also possible to incorporate other chemicals in small amounts to the thermoplastic coating powder to provide still additional desired properties. An example of this would be the addition, for instance, of molybdenum disulfide powder with a polyamide resin. The addition of molybdenum disulfide provides dimensional stability, additional lubricity and anti-wear properties to the final coating. The thermoplastic material may be pulverized to particle sizes ranging from 100 mesh to up to 500 mesh. This method has the advantage of being operative with fine particle size powders as for example, in the range of 500 mesh.

The coated tubing then passes into a cooling unit 24 where it is cooled with hot water. The cooling unit 24 is a tank approximately six feet long containing hot water which is at a temperature of 190° F. The coating adheres to the tubing better when hot water instead of cold water is used in the cooling unit. Thereafter, the water is removed by the air wiper 26 and the coated tubing 8 is rolled up on the stock reel 28.

This invention will now be described in greater detail in terms of a process for coating steel tubing, ¼" O.D., with polyamide resin. Referring now to FIGURE 2, the powdery thermoplastic material 30, polyamide resin in this example, in the elongated hopper 32 flows downward due to the force of gravity past the tapered portion of the hopper 32 and out the narrow slitted opening 34 at the bottom of the hopper 32, which can more clearly be seen in FIGURE 4. The width of the narrow slitted opening 34 may be adjusted by means of an adjustable metering plate (not shown) as is well known in the art which is associated with the bottom of the hopper 32. It is essential that a constant flow rate be maintained through the opening 34 to get a uniform coating. The discharge point of the hopper 32 is located several inches above the V-shaped receptacle 36 in order to allow the powder to disperse and mix with the air, thereby effecting a better distribution of the powder in the receptacle 36. In other words, the polyamide powder 30 is aerated as it leaves the narrow slitted opening 34 and falls into the V-shaped receptacle 36. With some types of powders, especially those having been packaged for a few months, it is necessary to use a vibrator (not shown on the figure) on the side of the hopper to assist in making the powder consistency more uniform. The polyamide powder 30 falls into the V-shaped receptacle 36 and forms a fluffy mass of polyamide powder which covers the steel tubing 8 to a depth of approximately 3 inches. The polyamide powder 32 encompasses the heated steel tubing 8 on all sides and leaves the V-shaped receptacle 36 by means of the ends 38 or through a narrow slit 40 at the bottom of the V-shaped receptacle 36.

The receptacle 36 is shown in FIGURES 2, 3, 4 and 5 in the form of a rectangular trough having a V-shaped cross sectional configuration. The receptacle may have any shape as long as it has a V-shaped cross sectional configuration. The trough 36 is in a horizontal position with the apex 40 of the trough centered an equal distance between and below the open end extremities of the inclined sides of the trough. The V-shaped trough 36 has outlet means at the apex 40 where the inclined sides converge. The length of the V-shaped trough is 10 feet. The tubing 8 is positioned in the center of the trough 36 so that there is approximately an equal powder mass on all sides of the tubing 8.

This invention relates to obtaining the proper flow characteristics of the polyamide powder 30 about the heated tubing 8 in the V-shaped receptacle 36. The flow characteristics of the polyamide powder 30 in the receptacle 36 depend upon the continuous flow of powder 30 into the receptacle 36 as for example from the opening 34 on the hopper 32, the geometrical configuration of the V-shaped receptacle 36, the openings at the ends and bottom of the V-shaped receptacle 36, as well as the force of gravity. The force of gravity, of course, causes the downward movement of the polyamide powder 30. The opening 34 is adjusted so that a continuous flow of powder maintains a mass of powder in the receptacle 36 which is supported by the inclined sides of the receptacle 36. If the flow rate is too slow through the opening 34, the density of the powder 30 on the side of the tubing 8 which faces the apex of the receptacle will not be sufficient, thereby causing the coating to be too thin on that side.

The inclined sides of the receptacle having a V-shaped configuration direct the movement of the powder 30 towards the center of the receptacle, that is, toward the tubing 8 and especially on the side of the tubing 8 facing the apex of the receptacle. The tapered sides cause a greater degree of compactness in the area immediately on the side of the tubing 8 which faces the apex of the receptacle than would normally occur without the V-shaped configuration and as a result the powder mass surrounding the tubing has essentially a uniform density. The V-shaped configuration is essential for the uniform coating on the side of the tubing facing the apex of the receptacle.

To obtain the required flow characteristics of the powder in the V shaped receptacle 36 it is necessary to properly adjust the openings at the ends 38 and at the narrow slit 40 at the bottom of the receptacle 36. If the flow rate through these openings is too slow, the powder will compact in this area resulting in the formation of stringers of plastic material on the side of the tubing facing the apex of the receptacle as well as forming a coating which is too thick on that side. Obtaining the proper flow rate in the receptacle 36 is easily accomplished by the proper adjustment of the opening 34 which regulates the flow of powder 30 into the receptacle 36 and the openings at the ends 38 and at the slit 40 which regulate the flow out of the receptacle 36. A vibrator 50, shown in FIGURES 3 and 4, assists in maintaining the powder 30 in the V shaped receptacle 36 in an agitated, free flowing, homogeneous state.

The powder 30 falls from the V shaped receptacle 36 to the bottom of the fusion tank 22 where it is reconveyed to the hopper by means 42, which can be more clearly seen in FIGURE 4. The powder can be reconveyed to the hopper by any conventional means such as a belt conveyor or a screw conveyor as shown in FIGURE 4. An air wiper 44 blows off the small excess thermoplastic material from the top of the tubing 8 after the tubing leaves the V shaped receptacle 36. The air wiper 44 also aids in the cooling of the film.

The thickness of the coating depends upon (a) the powder, (b) the particle size, (c) the length of the receptacle, (d) the rate of flow of the powder, and (e) the rate the tubing is passed through the receptacle. With a polyamide resin we have coated tubing 8 to a thickness of 0.006 inch. Thicknesses less than 0.006 inch are subject to having imperfections. A thickness of 0.006 inch was obtained by passing the tubing through the V shaped trough at a rate of 120 feet per minute. It is possible to pass the tubing through the trough at a higher rate, for example 200 feet per minute or more. The rate the tubing is passed through the trough affects, of course, the rate the powder is passed into the trough.

This process may be used to obtain coatings which are much thicker than normally obtained by such a process by the incorporation of foaming or blowing agents. Any suitable foaming agent such as 2,2'-azo-isobutyronitrile or those mentioned in U.S. Patent No. 2,981,631 may be used. For example, a foaming agent can be incorporated into a polyamide powder so that the resulting coating will increase from 20% to 100% depending on the amount of foaming agent added. In other words, a five mil polyamide coating could be increased to 6 mils or 10 mils by the addition of a foaming agent. The resultant 6 mil coating on the tube would have a similar visual appearance; however, the 10 mil coating would exhibit more of the properties typical of a foam plastic. These coatings would have a closed self-structure and therefore would not be porous.

In FIGURE 3, a preferred embodiment of this invention is shown in which the V shaped receptacle 36 contains an inner V shaped receptacle 48. The inner V shaped receptacle 48 is open at the ends and has a narrow slit opening 39. When an inner V shaped receptacle 48 is used, the outer V shaped receptacle 36 serves as a flow regulator for the powder in the inner V shaped receptacle 48. The use of an inner V shaped receptacle 48 results in a more uniform coating, especially if the powder is of the type which does not flow readily.

Figure 5:
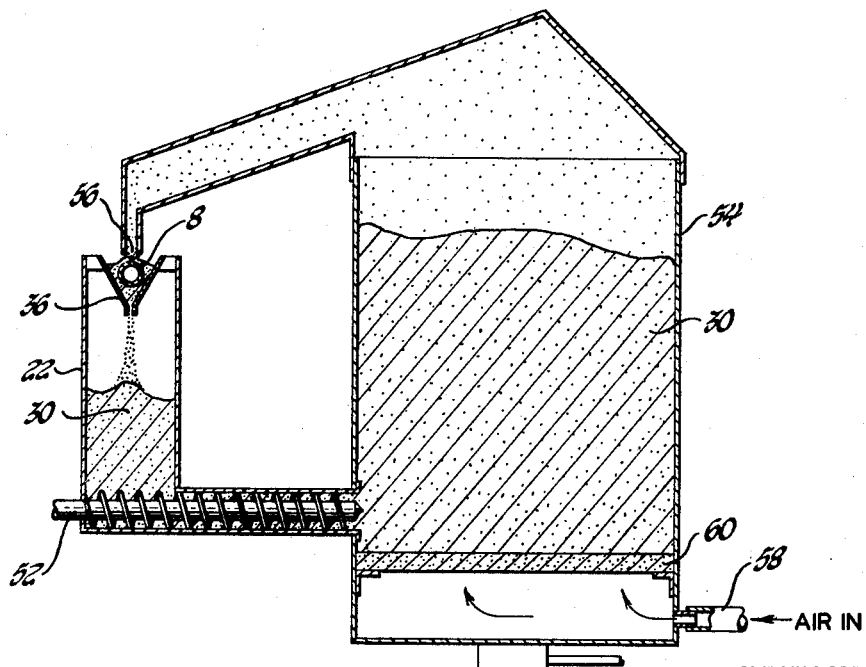
FIGURE 5 is a cross sectional end view of the fusion tank and a screw conveyor and fluidized bed arrangement to facilitate the conveyance of the powder from the tank to the V-shaped receptacle.

In FIGURE 5 a preferred embodiment of this invention is shown in which the powder 30 is reconveyed back to the V shaped receptacle 36 by means of a screw conveyor 52 which conveys the powder from the collection portion of the fusion tank 22 into a fluidized bed chamber 54. Air from a tank (not shown) enters the bottom of the fluidized bed chamber at opening 58 and proceeds upward through the gas pervious partition 60 to convey the particles in a fluidized state upward and out through the opening 56 back into the V shaped receptacle 36. This embodiment has the advantage of completely aerating or fluidizing the powder to make it uniform. When such a conveyor system is used, a particle size of the powder ranging from 200 to 400 mesh was found to work satisfactorily. When using such a system powders having particle sizes smaller than 400 mesh should not be used because the gas pervious partition 60 can be clogged with the very fine powder particles.

While the invention has been described in terms of certain specific examples, it is to be understood that the scope of the invention is not limited thereby except as defined in the following claims.

I claim:

1. A method of continuously forming an adherent protective coating on the surface of an elongated article of indefinite length comprising the steps of pouring a powdery thermoplastic coating material under the force of gravity into a receptacle having a V shaped cross-sectional configuration and having an outlet means at the base thereof for continuously conveying said material therefrom, said material being poured into said receptacle at a rate such that a mass of continuously moving material is supported by the inclined sides of said receptacle, heating said article to at least the melting temperature of said material, continuously passing said heated article through said mass supported in said receptacle at a rate such that the material adjacent said article is caused to melt and form a molten coating thereon, said receptacle being operative to maintain a layer of said material of substantially uniform density entirely about said article within said mass, said molten coating being cooled and solidified on said article in the form of an adherent coating of substantially uniform thickness after it leaves said mass.

2. A method in accordance with claim 1 in which the said elongated article is a metal article.

3. A method in accordance with claim 1 in which the said elongated article is ferrous based tubing.

4. A method in accordance with claim 1 in which the surfaces of said elongated article are substantially non-porous.

5. A method of continuously forming an adherent protective coating on the surface of elongated article of indefinite length comprising the steps of pouring a powdery thermoplastic coating under the force of gravity into a receptacle having a V shaped cross-sectional configuration and having an outlet means at the base thereof for continuously conveying said material therefrom, said receptacle containing an inner receptacle having a V shaped cross-sectional configuration and having an outlet means at the base thereof for continuously conveying said material therefrom, said material being poured into said receptacles at a rate such that a mass of continuously moving material is supported by the inclined sides of said receptacles, said material flowing in the outer receptacle moderating the flow of said material in the inner receptacle, heating said article to at least the melting temperature of said material, continuously passing said heated article through said mass supported in said inner receptacle at a rate such that the material adjacent said article is caused to melt and form a molten coating thereon, said receptacle being operative to maintain a layer of said material of substantially uniform density entirely about said article in said mass, said molten coating being cooled and solidified on said article on the form of an adherent coating of substantially uniform thickness after it leaves said mass.

6. A method of continuously forming an adherent protective coating on the surface of an elongated article of indefinite length comprising the steps of pouring a powdery thermoplastic coating material under the force of gravity into a V shaped trough, said V shaped trough having an outlet means at the apex where the inclined sides converge thereof for continuously conveying said material therefrom, said material being poured into said trough at a rate such that a mass of continuously moving material is supported by the inclined sides of said trough, heating said article to at least the melting temperature of said material, continuously passing said heated article horizontally through said mass supported in said trough at a rate such that the material adjacent said article is caused to melt and form a molten coating thereon, said trough being operative to maintain a layer of said material of substantially uniform density entirely about said article within said mass, said molten coating being cooled and solidified on said article in the form of an adherent coating of substantially uniform thickness after it leaves said mass.

7. A method of continuously forming an adherent protective coating on the surface of an elongated article of indefinite length comprising the steps of pouring a powdery thermoplastic coating material under the force of gravity into a receptacle having a V shaped cross-sectional configuration and having an outlet means at the base thereof for continuously conveying said material therefrom, said material being poured into said receptacle at a rate such that a mass of continuously moving material is supported by the inclined sides of said receptacle, heating said article to at least the melting temperature of said material, continuously passing said heated article through said mass supported in said receptacle at a rate such that the material adjacent said article is caused to melt and form a molten coating thereon, said receptacle being operative to maintain a layer of said material of substantially uniform density entirely about said article within said mass, said powder coming out of the outlet at the base of the receptacle being conveyed by suitable means to a fluidized bed chamber wherein the powdery material is fluidized and returned to the receptacle, said molten coating being cooled and solidified on said article in the form of an adherent coating of substantially uniform thickness after it leaves said mass.

8. A method of continuously forming an adherent protective coating on the surface of an elongated metal article of indefinite length comprising the steps of pouring a powdery thermoplastic coating material under the force of gravity into a V shaped trough, said V shaped trough having an outlet means at the apex where the inclined sides converge thereof for continuously conveying said material therefrom, said V shaped trough containing an inner trough having a V shaped cross-sectional configuration and positioned in a manner similar to the outer V shaped trough, said material being poured into said troughs at a rate such that a mass of continuously moving material is supported by the inclined sides of said troughs, heating said article to at least the melting point of said material, continuously passing said heated article horizontally through said mass supported in said inner trough at a rate such that the material adjacent said article is caused to melt and form a molten coating thereon, said trough being operative to maintain a layer of said material of substantially uniform density about said article within said mass, said powder coming out of the outlet at the base of the receptacle being conveyed by suitable means to a fluidized bed chamber wherein the powdery material is fluidized and returned to the receptacle, said molten coating being cooled and solidified on said article in the form of an adherent coating of substantially uniform thickness after it leaves said mass.

9. A method of forming an adherent protective coating on the surface of an article comprising the steps of pouring a pulverant thermoplastic coating material under the force of gravity into a receptacle having a V shaped cross-sectional configuration and having outlet means at the base thereof for continuously conveying said material therefrom, said material being poured into said receptacle at a rate such that a mass of continuously moving material is supported by the inclined sides of said receptacle, heating said article to at least the melting temperature of said material, immersing said heated article within the said mass supported in said receptacle for a time sufficient to cause the material adjacent said article to melt and form a molten coating thereon, said receptacle being operative to maintain a layer of substantially uniform density of said material entirely about said article, and removing said article from said receptacle whereby said melted material is cooled and solidified on said article in the form of an adherent cotaining of substantially uniform thickness.

References Cited
UNITED STATES PATENTS

| | | | |
|---|---|---|---|
| 2,478,940 | 8/1949 | Pape | 118—429 X |
| 2,760,229 | 8/1956 | Cheney et al. | 117—21 X |
| 3,016,875 | 1/1962 | Ballentine et al. | 117—18 X |
| 3,044,893 | 7/1962 | Heintz et al. | 117—23 X |
| 3,197,324 | 7/1965 | Brooks. | |
| 3,285,224 | 7/1963 | Reser | 118—405 |

WILLIAM D. MARTIN, *Primary Examiner.*

P. F. ATTAGUILE, *Assistant Examiner.*